J. A. CRAIG.
ROLLER BEARING.
APPLICATION FILED SEPT. 19, 1912. RENEWED DEC. 1, 1915.
1,188,345.
Patented June 20, 1916.
2 SHEETS—SHEET 1.
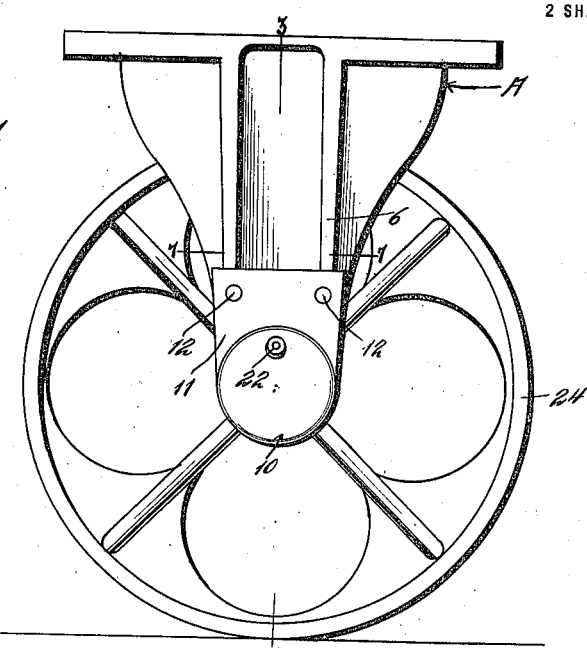
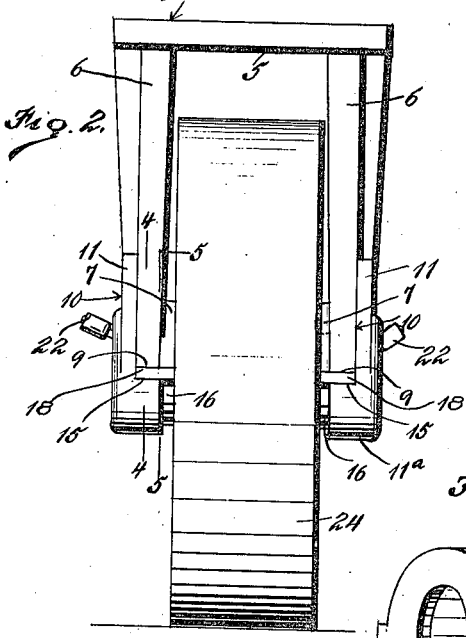
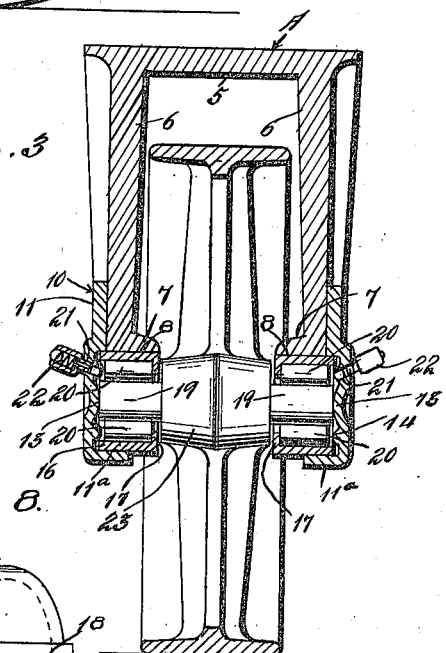
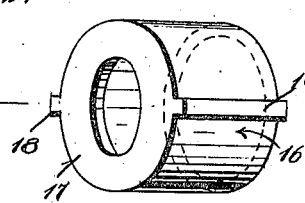
Witnesses
Inventor
J. A. Craig
By Chandler & Chandler
Attorneys J. A. CRAIG.
ROLLER BEARING.
APPLICATION FILED SEPT. 19, 1912. RENEWED DEC. 1, 1915.
1,188,345.
Patented June 20, 1916.
2 SHEETS—SHEET 2.
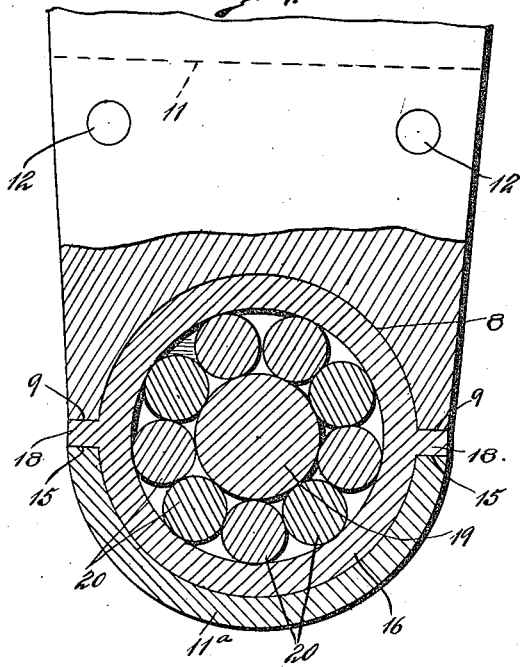
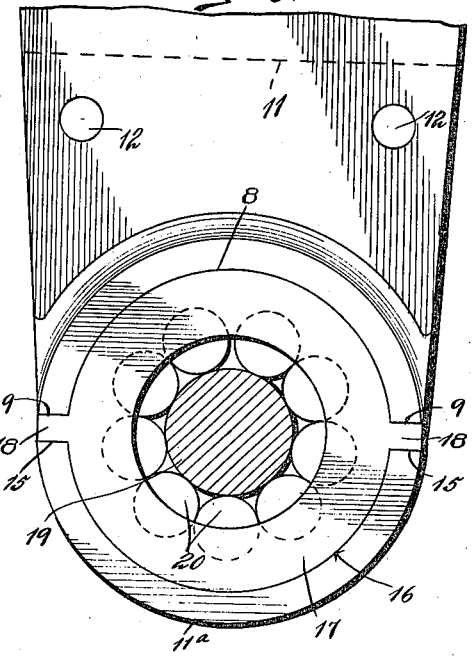
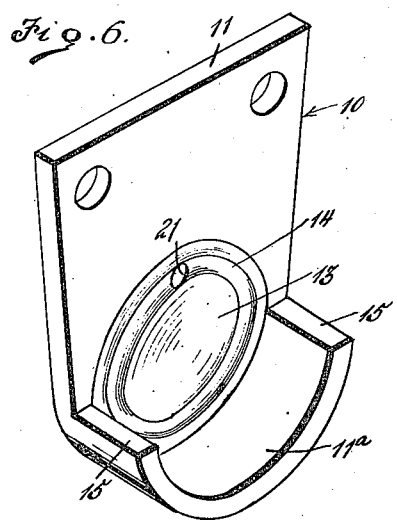
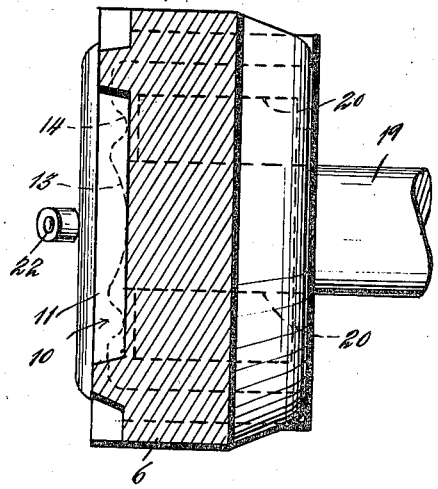
Inventor
J. A. Craig.
Witnesses
By
Attorneys.

UNITED STATES PATENT OFFICE.

JOHN A. CRAIG, OF JOHNSONBURG, PENNSYLVANIA.

ROLLER-BEARING.

1,188,345.  Specification of Letters Patent.  Patented June 20, 1916.

Application filed September 19, 1912, Serial No. 721,233. Renewed December 1, 1915. Serial No. 64,582.

*To all whom it may concern:*

Be it known that I, JOHN A. CRAIG, a citizen of the United States, residing at Johnsonburg, in the county of Elk, State of Pennsylvania, have invented certain new and useful Improvements in Roller-Bearings; and I do hereby declare the following to be a full, clear, and exact description of the invention, such as will enable others skilled in the art to which it appertains to make and use the same.

This invention relates to new and useful improvements in roller bearings and although the invention is primarily intended for use in connection with hand trucks, it may be used with equal success in connection with pulleys and other rotatable elements.

The principal object of the invention is to provide a bearing for the purpose set forth which is so constructed that the parts may be readily assembled or disassembled and which, when in the former position, will include an oil receptacle for containing the bearing roller.

Another object of the invention is to provide a roller bearing of the character described which is composed of a minimum number of parts, is therefore simple in construction and is cheap to manufacture.

With these and other objects in view, the invention consists in the construction and novel combination of parts hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings: Figure 1 is a side elevation of a bearing constructed in accordance with my invention, Fig. 2 is an end view thereof, Fig. 3 is a vertical sectional view taken on the line 3—3 of Fig. 1, Fig. 4 is a cross sectional view taken on the line 4—4 of Fig. 2, Fig. 5 is a cross sectional view taken on the line 5—5 of Fig. 2, Fig. 6 is a perspective view of the detachable cap, Fig. 7 is a cross sectional view taken through one of the bracket arms taken on the line 7—7 of Fig. 1, and Fig. 8 is a perspective view of the bushing.

Like reference numerals designate corresponding parts in all the figures of the drawings.

Referring to the drawings, A designates an inverted U-shaped bracket which includes a connecting portion 5 adapted to be connected to the underface of a hand truck or the like, and depending spaced arms 6—6, the lower end of each arm being formed with an inwardly extending projection 7. The lower end of each arm is centrally formed with a transversely disposed and upwardly extending semi-circular recess 8 which forms consequent shoulders 9—9. A cap, which is designated as a whole by the reference numeral 10, includes a plate 11 which is disposed against the outer face of each arm 6 and is secured to said arm by means of bolts 12—12. This plate closes the recess 8, and is pressed inwardly to form a bearing 13 arranged concentric with the recess 8. Extending inwardly from the plate 11 around the bearing 13 is an annular rib 14 which constitutes a circular bearing. The lower end of the plate is formed with an inwardly extending semi-circular flange 11$^a$, the ends 15—15 thereof being disposed in opposed and in spaced relation to the shoulders 9 of the arm 6.

The recess 8 and flange 11$^a$ conjointly form a seat for receiving an annular bushing 16, and this bushing is formed on its inner edge with an inwardly extending flange 17. Extending outwardly from the bushing at diametrically opposite points are transverse lugs 18—18 which are respectively seated between the shoulders 9 and the ends 15 of the flange 11$^a$. As a result, the bushing 16 is interlocked by means of the lugs 18 between the arms 6 and the cap 10 in such a manner as to prevent rotation of said bushing. An axle 19 has its ends respectively extending through the flange 17 of the bushing 16, and has its extreme ends operating against the bearing 13 of the caps 10. Disposed around the axle 19 and the bushing 16 is a plurality of bearing rollers 20, said rollers having their ends operating intermediate the annular bearing 14 of the cap 10 and the inwardly extending flange 17 of the bushing 16.

Formed in the cap 10 is an opening 21 which communicates with the bearing rollers 20, and mounted in this opening is a spring actuated valve 22 which will normally remain seated and yet permit of the operator readily oiling the rollers whenever necessary.

Mounted on the axle 19 intermediate the bushing 16 of the arms 6 is the hub 23 of a wheel 24.

In practice, it will be observed that the flanges 11ª of the plate 10 serve to support the bushing upon the lower end of a respective arm 6, and that the bushing in turn is interlocked against rotation between the arm and the plate, and that this bushing is formed with an inwardly extending flange which, together with the plate, retains the rollers in their proper position around the axle. It will also be observed that when it is desired to take the bearing apart for any cause whatever, it may be easily done by withdrawing the bolts 12 of each cap 10.

What is claimed is:

A roller bearing comprising an inverted U-shaped bracket having open semi-circular recesses in the lower ends of the legs thereof, an annular bushing located in each of said recesses and having outwardly extending flanges thereon engaging the lower ends of the said legs, the said bushings having flanges on the inner ends thereof, a plurality of bearing rollers mounted in said bushings, a cap detachably secured to the lower end of each of said legs, the said cap having circular grooves on their inner faces in which the outer ends of the said bushings are located, and an axle extending between said bushings and mounted between the rollers therein, the said caps having inwardly extending substantially convex portions located in such manner as to bear against the ends of the axle to prevent end thrust thereof.

In testimony whereof, I affix my signature, in presence of two witnesses.

JOHN A. CRAIG.

Witnesses:
K. L. McLane,
C. H. Keister.